United States Patent [19]

Gillett

[11] Patent Number: 5,058,053
[45] Date of Patent: Oct. 15, 1991

[54] HIGH PERFORMANCE COMPUTER SYSTEM WITH UNIDIRECTIONAL INFORMATION FLOW

[75] Inventor: John B. Gillett, Woodstock, N.Y.

[73] Assignee: International Business Machines Corporation, Armonk, N.Y.

[21] Appl. No.: 564,661

[22] Filed: Aug. 7, 1990

Related U.S. Application Data

[63] Continuation of Ser. No. 176,495, Mar. 31, 1988, abandoned.

[51] Int. Cl.⁵ .................... G06F 1/00; H05K 7/00
[52] U.S. Cl. .................... 364/900; 364/929.2; 364/929.1; 364/929.4; 364/931.4; 364/940.61; 364/935; 361/413; 361/398
[58] Field of Search ............ 364/200, 900; 361/413, 361/396, 398

[56] References Cited

U.S. PATENT DOCUMENTS

| | | | |
|---|---|---|---|
| 4,237,546 | 12/1980 | Wells | 364/900 |
| 4,703,394 | 10/1987 | Petit et al. | 361/413 |
| 4,777,615 | 10/1988 | Potash | 364/900 |
| 4,800,383 | 1/1989 | Considine | 361/413 X |

Primary Examiner—Gareth D. Shaw
Assistant Examiner—P. Kulik
Attorney, Agent, or Firm—Robert L. Troike

[57] ABSTRACT

A high performance computer system with a plurality of processors and memory modules is arranged with the processor modules stacked one upon the other with first switch modules in a first stack and with the memory modules stacked one on the other with second switch modules in a second stack. The first and second stacks are arranged adjacent to each other with the first and second switch modules diagonally opposed. Interconnecting bus lines couple the processors to the memory modules through the first switch modules and couple the memory modules back to the processors through the second switch modules. The flow of data is in one direction through the memory modules and switches to reduce wire length, latency and skew while supporting fast cycle time and high bandwidth.

19 Claims, 6 Drawing Sheets

HIGH PERFORMANCE COMPUTER SYSTEM WITH UNIDIRECTIONAL INFORMATION FLOW

This application is a continuation of application Ser. No. 176,495, filed Mar. 31, 1988, now abandoned.

This invention relates to computer systems and more particularly to a high performance computer system comprising a plurality of processors and a plurality of storage modules with these processors and modules coupled with minimum wire length, latency and skew while supporting very fast cycle times at high band width.

BACKGROUND OF THE INVENTION

The trend in high performance computers is to use increasing number of processors operating cooperatively in common memory. The memory is broken into a number of independently addressable modules known as Basic Storage Modules (BSM). If there are 'n' processors, the number of Basic Storage Modules 'm' is likely to be greater than 'n'. Since the processors require equal access to the memories, there is some form of 'n×m' switch to select the appropriate path between the processor and the currently addressed memory for storing and retrieval of the data.

Parameters of importance to the performance of the system are processor cycle time, bandwidth, electrical path length, round trip delay, and timing skew.

The processor cycle time is minimized by placing the cycle determining path elements in the closest possible proximity to each other. The bandwidth between processor and memory is achieved by using the fastest possible data rate over a large number of parallel connections between the processors and switches, and the switches and the Basic Storage Modules. The electrical path length is the length between data latching points on different, but interconnected functional units as measured in nanoseconds. The total round trip delay from a processor to a memory and back is known as the memory latency. This includes a number of electrical path lengths. The skew is the electrical path length differences due to variations in routing from one point to another. The area of memory is determined by the surface area required to contain the storage chips and the logic support chips. In a typical case of a Card-on-Board (COB) memory, all of the external interconnections are placed on one edge of the card. When the memory is accessed for data, a signal must travel from the input edge of the card to the far side, and return back to the original edge. In so doing, it has traversed the width of the card twice, with attendant delay, and the required data appears at the same edge from which it was requested, and therefore no closer to the final destination.

It is evident that with these conventional systems, there is significant skew or differences in electrical path due to accessing different parts of the memory or different memory chips in different sections of the memory, or from different processors.

SUMMARY OF THE INVENTION

In accordance with the one embodiment of the present invention, the wire length, latency and skew are minimized while supporting a very fast cycle time and high band width by stacking processors with either a request or respond switch module stacked side by side with memory modules and respectively a respond or request switch module, with the respond and request switch modules diagonally opposed to each other and the processor diagonally opposed to the memory modules and wherein the inputs and outputs of the memory modules and the switches are on opposite edges of the modules wherein there are multiple wire coupling lines from the processor modules to the corresponding request switch module and from the request switch module to the memory modules and from the memory modules to the response switch module and from the response switch module back to the processors.

DESCRIPTION OF A PREFERRED EMBODIMENT OF THE PRESENT INVENTION

Figure 1:
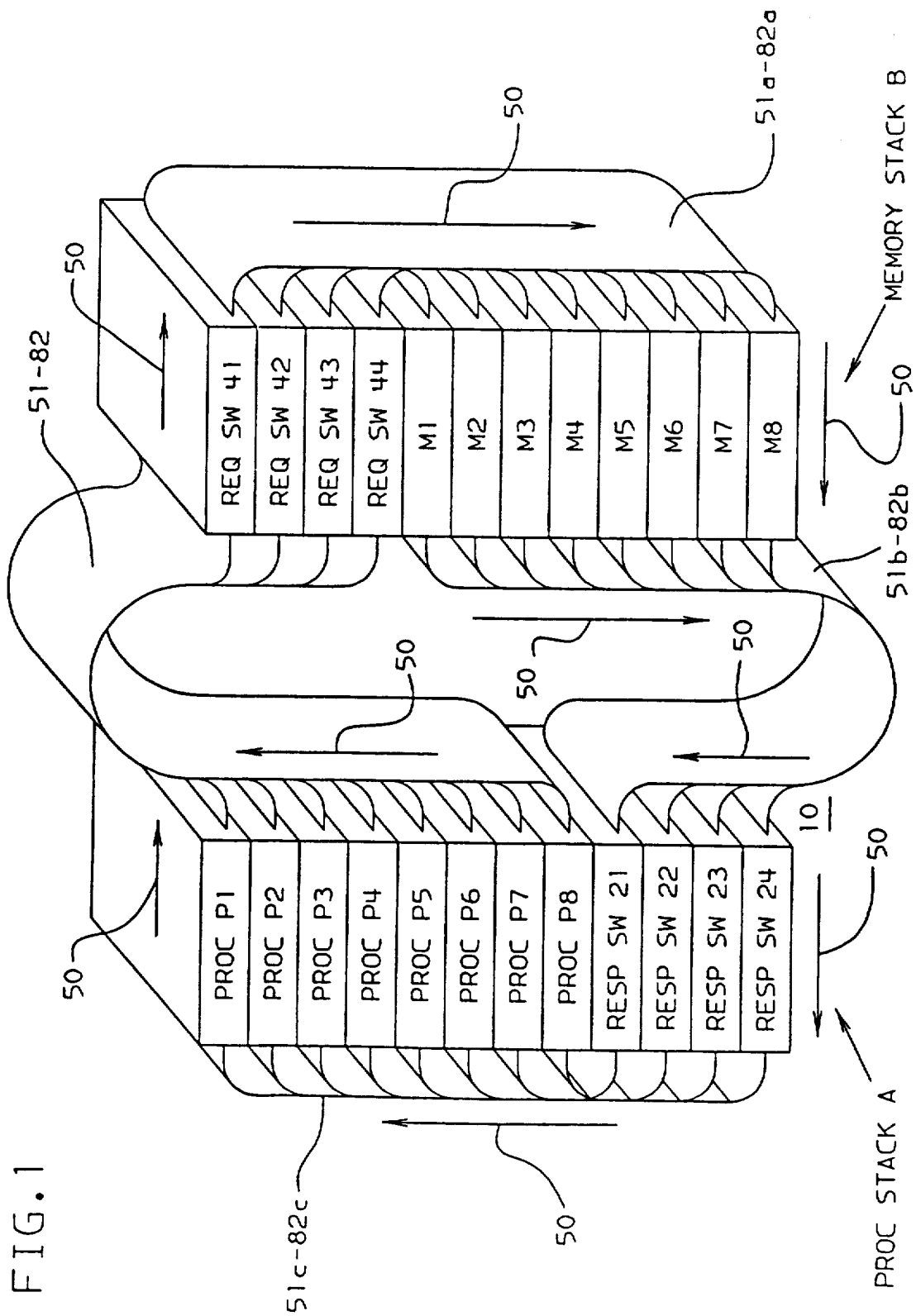
FIG. 1 is a block diagram showing the layout of the computer system according to one preferred embodiment of the present invention.

According to FIG. 1, there is shown a system 10 according to one embodiment of the present inventions that comprises eight processors P1-P8 that are connected to eight memory modules or Basic Storage Modules (BSM) M1 thru M8 via four request switch modules 41-44, 32 flat ribbon like cables 51-82 and 32 flat ribbon cables $51a$-$82a$. Cables $51a$-$82a$ may be conductors on a printed circuit board. The BSM M1 thru M8 are coupled back to the processors P1-P8 through respond switch modules 21-24, 32 flat ribbon cables $51b$-$82b$ and 32 flat ribbon cables $51c$-$82c$. Cables $51c$-$82c$ may be conductors on a printed circuit board.

Figure 2:
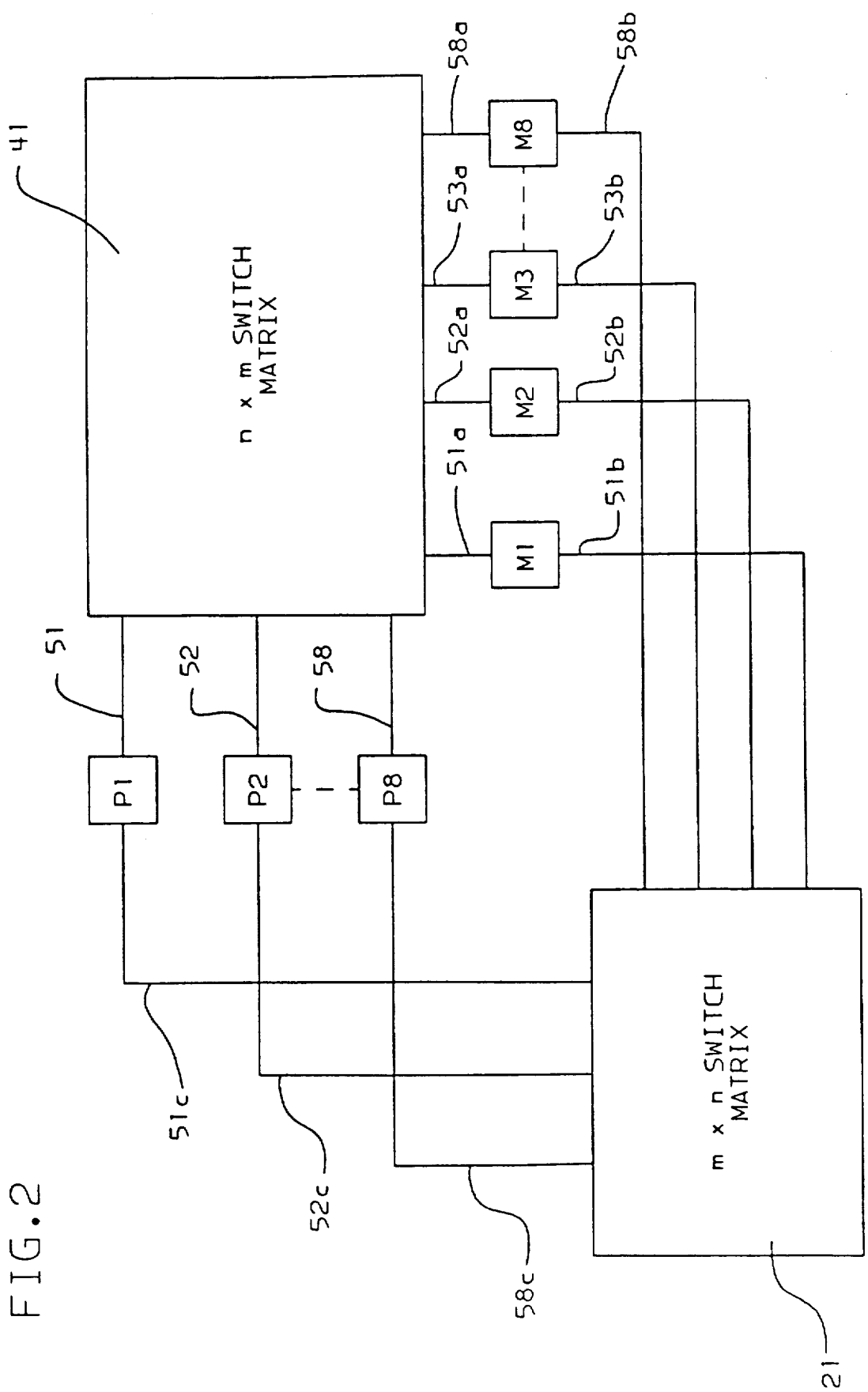
FIG. 2 is a functional block diagram of the system of FIG. 1.

Each switch module comprises a matrix of n×m switches which for the embodiment is 8×8 matrix or 64 switches. FIG. 2 shows a functional block diagram of a data slice through one request switch module 41 and one respond switch module 21. Similar data slices pass through request switch modules 42-44 and respond switch modules 22-24. The system may take this form in one embodiment of the present invention.

In the layout of the multiple switch module embodiment of FIG. 1, the respond switch modules 21 through 24 are stacked one upon the other with the P1-P8 processors stacked above the respond switch modules 21 through 24 in processor stack A. In a stack B adjacent to the processor stack A, there is a stack of memory modules BSM M1-M8 with a stack of request switch modules 41-44 positioned on top of the BSM modules M1 thru M8. These two stacks A and B are arranged side by side with the flat ribbon-like cables interconnecting the switch modules, the memory modules and the processors so the information always flows in one desired direction as shown by the arrows 50 in FIG. 1. The general layout reduces the longest round trip to memory by an amount roughly equal to half the total wiring delay. This is accomplished by stacking the processors above or below one set of switch modules and the memory modules or Basic Storage Modules are either below or above the other set of switch modules where the Basic Storage Modules (BSM) M1-M8 are diagonally opposed to the processors P1-P8. The result of this is to reduce the total round trip wire length from approximately four times the height of the stack to only approximately twice the height of the stack. It can be seen that due to the unidirectional data flow, any penalty in the delay caused by a long path on one side of a unit stack is reduced by equal benefit in delay on the opposite side of the same stack. Further, all round trip delays are the same, independent of which processor or which BSM is used. Clocking signals may be routed along the same path as the data.

Figure 3:
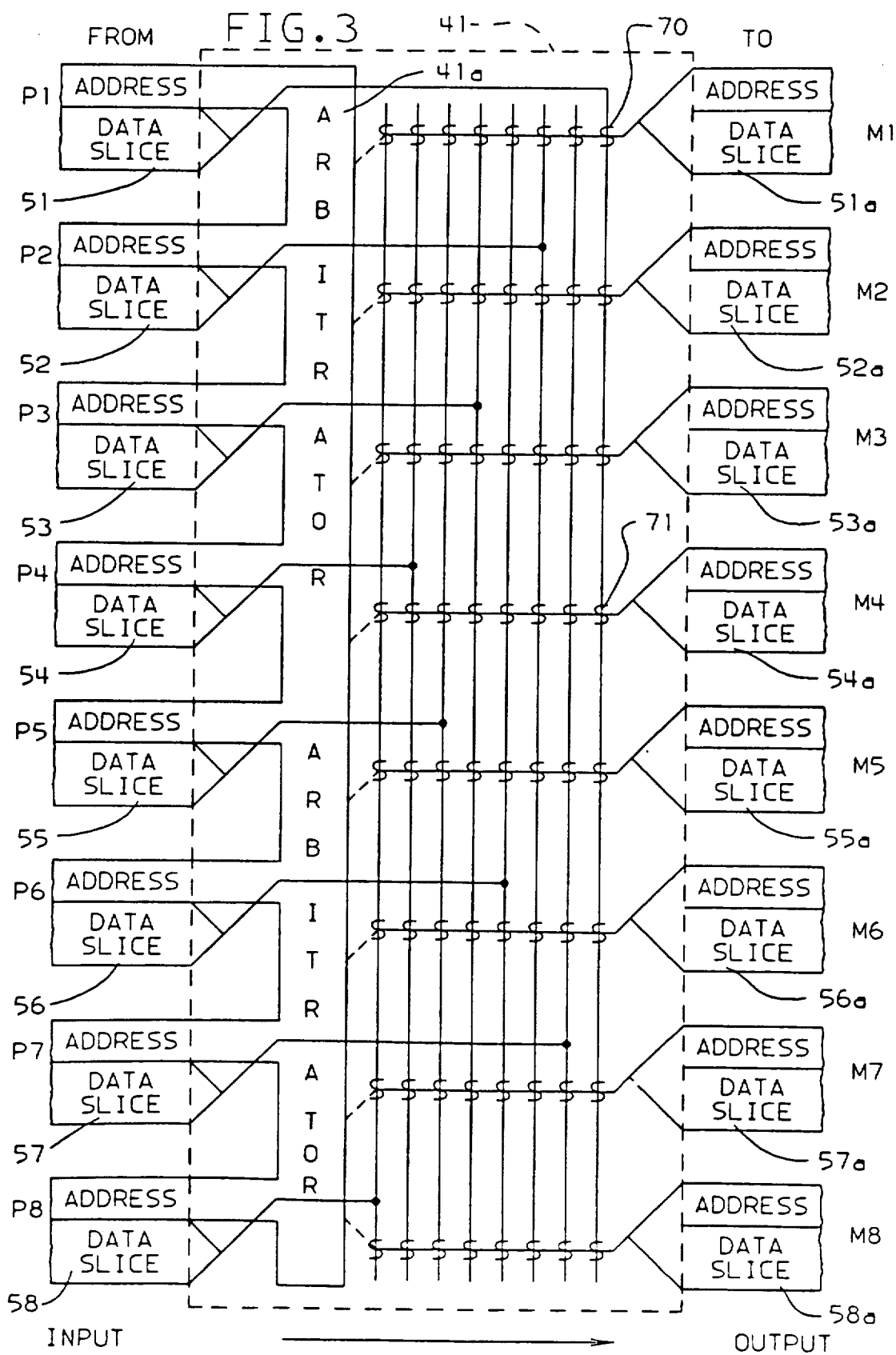
FIG. 3 illustrates a request switch module.

In accordance with the routing system described with four request switch modules 41-44, a data slice representing one quarter of a data word and address bits representing the designated BSM (one of M1 thru M8) is sent by a ribbon-like cable 51, which comprises parallel wire conductors on flexible dielectric film, from the output of processor P1 for example to request switch module 41 as shown, for example, in FIGS. 1, 2 and 3. This data slice and the associated address bits plus seven other data slices and address bits from the other processors P2 thru P8 are applied by the parallel conductors on flexible films or ribbon-like cables 52-58 to the input of the request switch module 41. The address bits associated with each data slice on each cable are decoded by the arbitrator 41a to indicate to which Basic Storage Module (BSM) M1-M8 the data slice is to be applied. For example, if the data slice from processor P1 is to be applied to M1 the arbitrator detects that code and closes switch 70. If the decoder detects M4 it closes switch 71. If from processor P4 for memory module M2 switch 72 is closed. The arbitrator resolves conflicts for the same BSM by applying priorities and queuing conflicting requests. Similarly, switch modules 42 thru 44 receive data slices and address bits from processors P1 through P8 via separate ribbon-like cables 59-82 (cables 59-66 to switch module 42, cables 67-74 to switch module 43, and cables 75-82 to switch module 44). The cables 51-82 extend between the near inner edges of the stacks A and B as shown in FIG. 1. The switch modules 42-44 switch the respective data slices to the appropriate BSM M1 thru M8. There are therefore eight parallel flexible film cables or ribbon cables (one from each processor P1-P8) coupled to each of the request switch modules 41-44.

Figure 4:
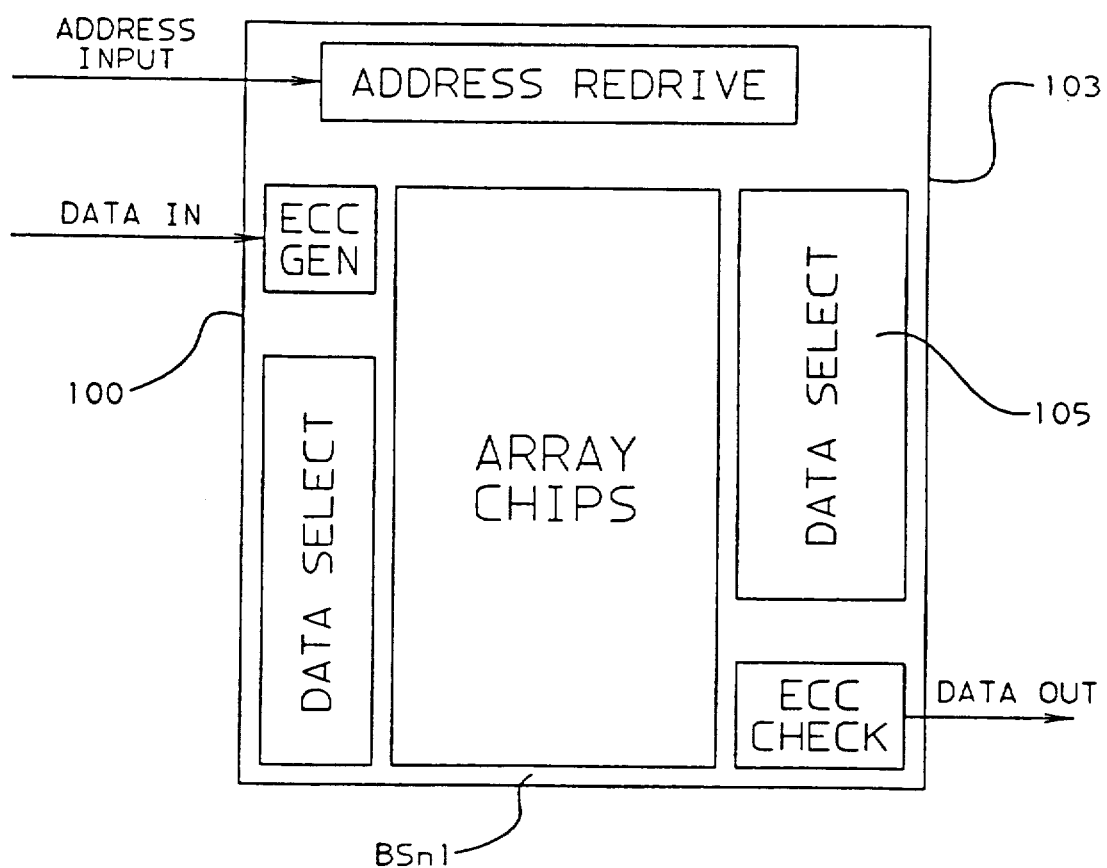
FIG. 4 illustrates a memory module.

There are eight ribbon output cables from each switch module 41-44 with one for each BSM M1 thru M8 or a total of 32 cables 51a thru 82a. These cables 51a thru 82a extend along the outboard surface of the memory stack B. This may be provided by a printed circuit board. The inputs from the processor enter at one input edge of the switch module and exit from an opposite edge. The address bits can also be part of the address for storage. In the example, the address bits are sent out along with the data slice to address the memory location within the BSM M1 thru M8. The input to the BSM M1 thru M8 with address enters at one edge 100 of the BSM and when retrieved exits from the opposite edge 103 as shown in FIG. 4. The address bits are applied to the address input and the data is applied to data input and stored in the array at the address location. The four inputs from the four switches 41-44 are sent to the memory modules via the data select input.

Figure 5:
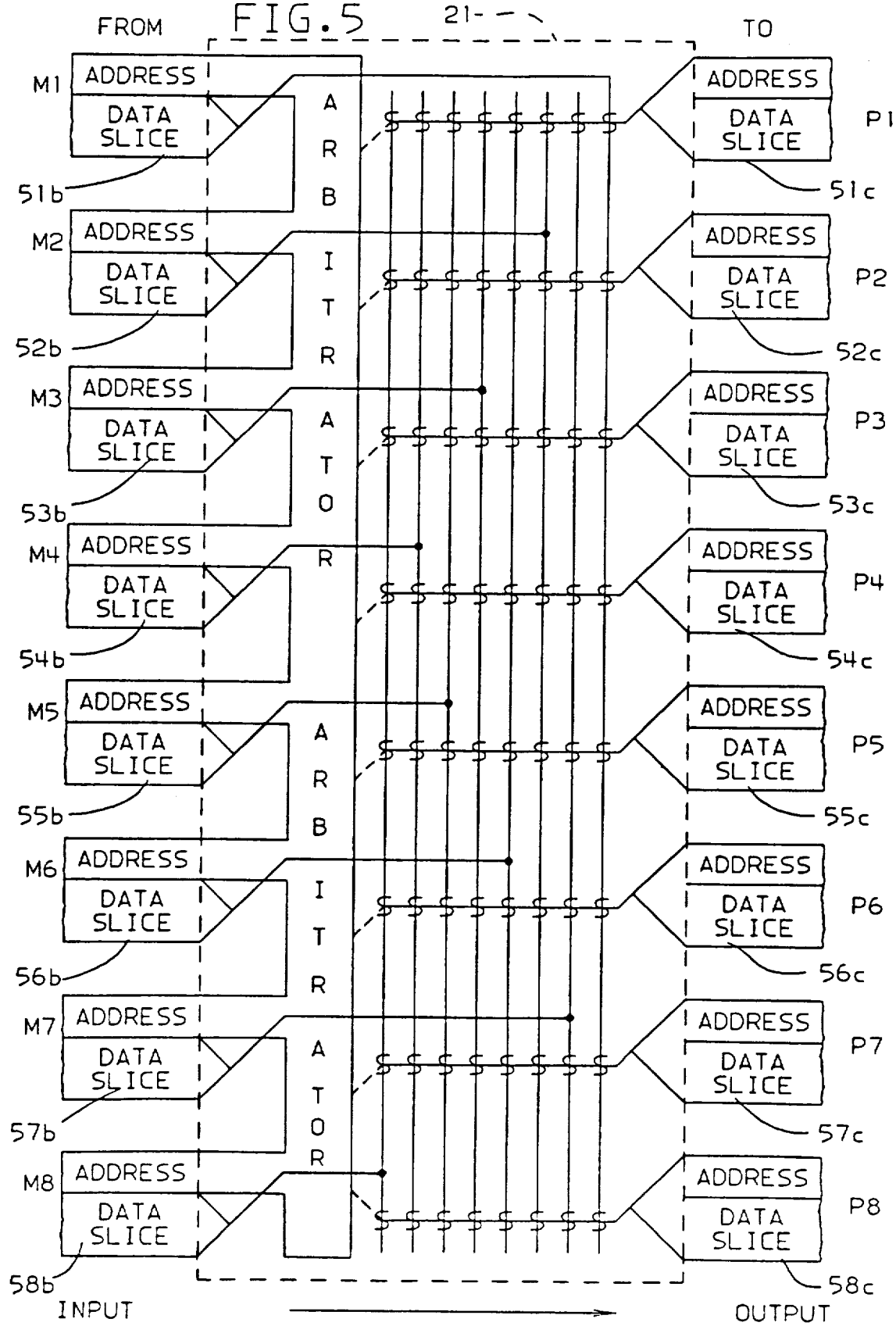
FIG. 5 illustrates a respond switch module.

The data with the processor address bits when retrieved exits at the opposite edge 103 of the BSM M1-M8. There are four groups of outputs from each of the Basic Storage Module M1-M8 located at the opposite edge of the BSM. The outputs from the memory chips are selected by the data select 105. Each output group includes a data slice and processor address bits. These four outputs from each of module M1-M8 are coupled via separate ribbon cables 51b-82b to respond switch modules 21 through 24 which are similar to request switch modules 41-44. The ribbon cables 51b-82b from these Basic Storage Modules M1-M8 are coupled between the inside edge of the memory stack B of M1-M8 to the inside edge of the processor stack A at the respond switch modules 21-24. The BSM M1-M8 are coupled to respond switch modules 21 via cables 51b-58b. See FIG. 5. In the same manner the connection is made between the memory modules M1-M8 and respond switch modules 22-24 via cables 59b-82b. All eight memory modules M1-M8 are coupled to each switch module 21 thru 24 with a processor address associated with each data slice. The respond switch modules as shown in FIG. 5 are like those in FIG. 3 except that the input with its data slice and address bits is identifying which processor to be coupled to rather than which memory.

The outputs from the respond switch modules 21-24 are coupled by ribbon cables 51c-82c from the opposite edges of the switch modules 21-24 along the outside edge of the processor stack A to the processors P1 through P8 on the outboard sides of the stack. These cables may be conductors on a printed circuit board. As noted, the circulation is all in one direction (clockwise in this case) with unidirectional path. The input is always at one edge of the module and output at the opposite edge.

Figure 6:
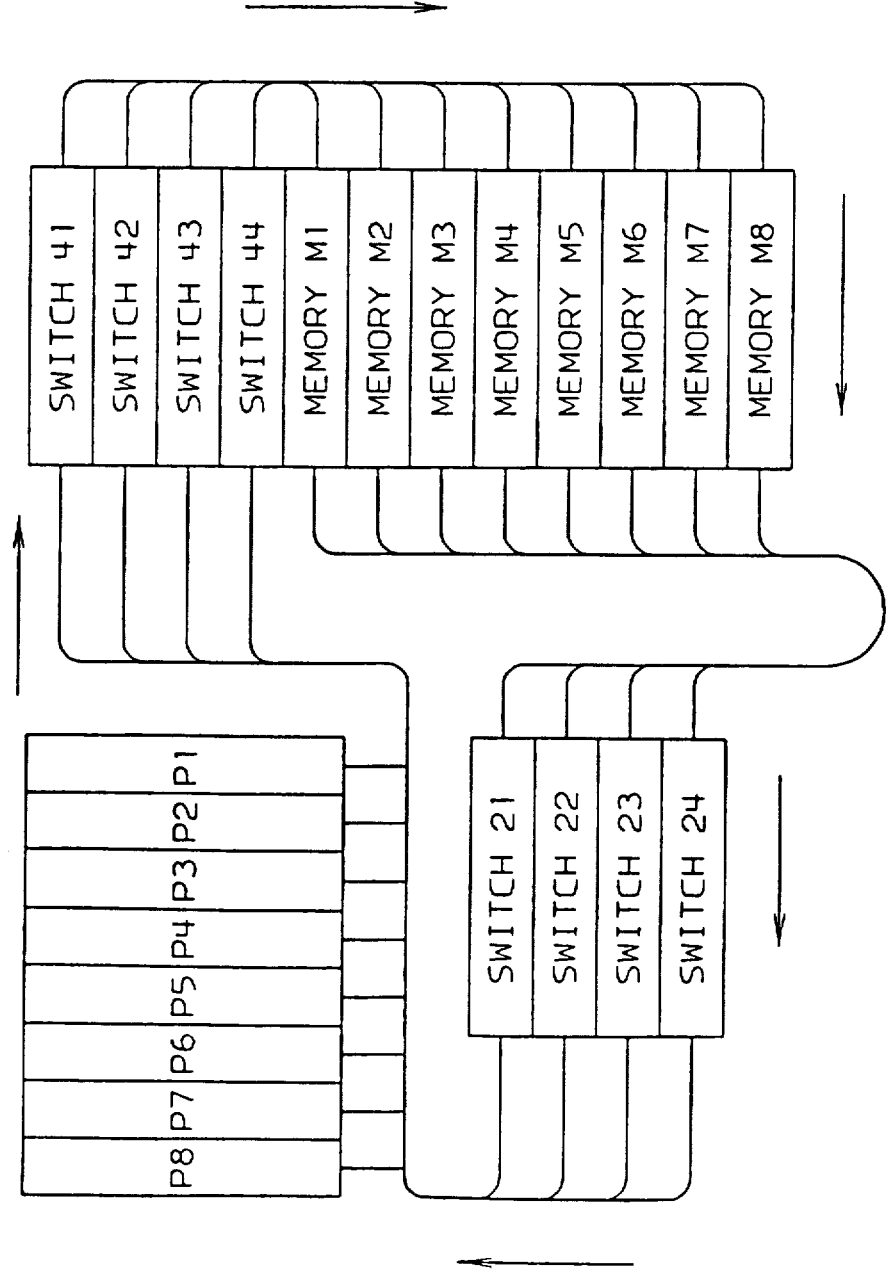
FIG. 6 is a layout of an alternative embodiment of the present invention wherein the processors have a common input and output edge.

In an alternative embodiment shown in FIG. 6, the inputs and outputs of the processors P1-P8 are at the same end.

I claim:
1. A computer system comprising:
   a plurality of processors stacked one above the other in a first stack, each of said processors providing memory addresses and data and receiving data,
   a first matrix switch module stacked on said first stack with said switch module either below or above said processors,
   a plurality of memory modules stacked one above the other on a second stack, said memory modules including an array of chips and separate input and output terminals on a board being arranged such that input of said addresses and data is applied at said input terminals along one edge of said board and output data is provided at an output terminal along the opposite edge of said board so that signal processing is in one direction through the said memory modules,
   a second matrix switch module stacked on said second stack with said switch module either being above or below respectively said memory modules,
   said first and second stacks being arranged adjacent to each other and with said first switch module and said second switch module being arranged such that said first switch module and said second switch module are diagonally opposed to each other,
   and means including interconnecting parallel bus lines coupling said processors to said memory modules through said first switch module and said memory modules back to said processors through said second switch module.

2. The computer system of claim 1 wherein said first switch module comprises an m×n matrix of switches with arbitrator means responsive to data slices of a word with address bits indicative of an address of the memory module and means responsive to the address bits for gating the data slice to an appropriate memory module.

3. A computer system comprising:
a plurality of processors stacked one above the other in a first stack, each of said processors providing memory addresses and data and receiving data,
a plurality of first matrix switch modules stacked one upon the other and on said first stack with said first switch modules either below or above said processors,
a plurality of memory modules stacked one above the other on a second stack, each of said memory modules including an array of chips and separate input and output terminals on a board being arranged such that input of said addresses and data is applied at an input terminal along one edge of said board and output data is provided at an output terminal along the opposite edge of said board so that the signal processing is in one direction through each of said memory modules,
a plurality of second matrix switch modules stacked on said second stack with said switch modules either being above or below respectively said memory modules,
said first and second stacks being arranged adjacent to each other and with the first and second switch modules being arranged such that the first and second switch modules are diagonally opposed to each other,
and means including interconnecting parallel bus lines for coupling said processors to said plurality of memory modules through said first switch modules and said memory modules back to the processors through said second switch modules.

4. The computer system of claim 3 wherein each of said first switch modules comprises an m×n matrix of switches with arbitrator means responsive to data slices of a word with address bits of said addresses indicative of an address of one of said memory modules and means responsive to address bits for gating the data slice to said one of said memory modules.

5. The computer system of claim 3 wherein said means for coupling includes first plural conductor cables between said processors and said first matrix switch modules at one edge, second plural conductor cables connected between an opposite edge of said first matrix switch modules and said one edge of said board of said memory modules, third plural conductor cables connected between said opposite edge of said board of said memory modules and one edge of said second matrix switch modules and fourth plural conductor cables connected between an opposite edge of said second matrix switch modules and said processors.

6. The computer system of claim 5 wherein said first matrix switch modules and said second matrix switch modules each include a matrix of switches, an arbitrator means for each switch responsive to address bits of said address for gating an appropriate one of said first or second matrix switch modules depending on said address bits.

7. The computer system of claim 5 wherein each of said processors has its input at one processor end and its output along an opposite processor end and the output from second matrix switch modules is coupled to said one processor end and the output to said first matrix switch modules is from said opposite processor end.

8. The computer system of claim 5 wherein said plurality of processors is stacked above said second switch modules on said first stack and said plurality of memory modules is stacked below said first switch modules on said second stack adjacent said first stack.

9. The computer system of claim 8 wherein said first cables extend between top inner edges of said first and second stacks, the second cables extend about an outer edge of the second stack, the third cables extend between lower inner edges of said first and second stacks and the fourth cables extend along an outer edge of the first stack.

10. The computer system of claim 8 wherein said first switch modules and said second switch modules includes a matrix of switches, an arbitrator means for each switch responsive to address bits for gating inputs to an appropriate output.

11. The computer system of claim 8 wherein each of said processors has its input at one processor end and its output along an opposite processor end and an output from the second switch module is coupled to said one processor end and the output to said first switch module is from said opposite opposite end.

12. The computer system of claim 1 wherein said bus lines include conductors carrying clocking signals whereby said clocking signals follow a unidirectional path through said memory modules and said switch modules.

13. The computer system of claim 12 wherein said clocking signals are synchronous with data signals also on said bus lines.

14. The computer system of claim 3 wherein said bus lines include conductors carrying clocking signals whereby said clocking signals follow a unidirectional path through said memory modules and said switch modules.

15. The computer system of claim 7 wherein said bus lines include conductors carrying clocking signals whereby said clocking signals follow a unidirectional path through said memory modules, said switch modules and said processors.

16. The computer system of claim 11 wherein said bus lines include conductors carrying clocking signals whereby said clocking signals follow a unidirectional path through said memory modules, said switch modules and said processors.

17. In a computer system having a plurality of processors and a plurality of memory modules, the improvement providing unidirectional signal flow from said processors through said memory modules back to said processors comprising:
a plurality of first matrix switch modules,
each of said memory modules including an array of storage chips and separate input and output terminals on a board with said memory modules being arranged such that addresses and data input from said processors is applied at said input terminals along one edge of said board and data output from said board is applied from an output terminal along an opposite edge of said board so that the addresses and data flow is in one direction through said memory modules,
a plurality of second matrix switch modules, and
means including interconnecting parallel coupling lines coupling said processors to said memory modules through said first switch modules and coupling said memory modules back to said processors through said second switch modules where said addresses and data flow from said processors through said memory modules back to said processors is unidirectional.

18. The computer system of claim 17 wherein said coupling lines include conductors carrying clocking signals whereby said clocking signals follow a unidirectional path through memory modules and switch modules.

19. The computer system of claim 17 wherein said memory modules are stacked in a given stack with a stack of a selected one of said first or said second switch modules.

* * * * *